(12) United States Patent
Yoshida et al.

(10) Patent No.: US 7,676,987 B2
(45) Date of Patent: Mar. 16, 2010

(54) GREENING STRUCTURE

(75) Inventors: Minoru Yoshida, Yamato (JP); Shigeru Suzaki, Yokohama (JP); Kazuo Kumura, Yamato (JP); Takaharu Yoshioka, Sagamihara (JP); Shinji Uchida, Toride (JP); Yasuyuki Ueda, Funabashi (JP)

(73) Assignee: Kyodo Ky-Tee Corp., Tokyo (JP)

( * ) Notice: Subject to any disclaimer, the term of this patent is extended or adjusted under 35 U.S.C. 154(b) by 622 days.

(21) Appl. No.: 10/542,726

(22) PCT Filed: Jan. 23, 2004

(86) PCT No.: PCT/JP2004/000613

§ 371 (c)(1), (2), (4) Date: Jul. 20, 2005

(87) PCT Pub. No.: WO2004/075629

PCT Pub. Date: Sep. 10, 2004

(65) Prior Publication Data

US 2006/0123704 A1 Jun. 15, 2006

(30) Foreign Application Priority Data

Feb. 26, 2003 (JP) .............................. 2003-048625

(51) Int. Cl.
*E01C 13/08* (2006.01)
(52) U.S. Cl. .................................... 47/1.01 F
(58) Field of Classification Search .................. 47/65.9, 47/77, 83, 85, 86
See application file for complete search history.

(56) References Cited

U.S. PATENT DOCUMENTS

| 4,118,892 | A | * | 10/1978 | Nakamura et al. | ............ | 47/65.9 |
| 5,373,661 | A | * | 12/1994 | Furukawa | .................... | 47/65.9 |
| 5,467,555 | A | * | 11/1995 | Ripley et al. | ................. | 47/65.9 |
| 6,237,285 | B1 | * | 5/2001 | Yoshida et al. | ............... | 47/65.9 |
| 6,779,946 | B1 | * | 8/2004 | Urriola et al. | ................. | 405/43 |

FOREIGN PATENT DOCUMENTS

| JP | 5-87005 | | 11/1993 | | |
| JP | 405284851 | A | * 11/1993 | ................. | 47/65.9 |
| JP | 10-98950 | | 4/1998 | | |
| JP | 410098950 | A | * 4/1998 | | |
| JP | 11-289876 | | 10/1999 | | |

* cited by examiner

*Primary Examiner*—Francis T Palo
(74) *Attorney, Agent, or Firm*—Edwards Angell Palmer & Dodge LLP (57) ABSTRACT

A greening structure comprising a plant-cultivatable planting portion on a water-reserving portion and laid on a pavement for forming a greening area. The greening structure further comprises post-shaped members provided substantially consecutively from a portion where an external force loaded on the planting portion is directly received, to the bottom of the water-reserving portion or to the pavement, so that the external force loaded on the planting portion is received on the pavement through the post-shaped members. The greening structure is excellent in the supporting strength and the stability to provide a satisfactory treading feel. The substantially consecutive post-shaped members include: first post-shaped members disposed upward from the bottom of the planting portion; and second post-shaped members disposed downward from the bottom of the planting portion.

3 Claims, 12 Drawing Sheets

GREENING STRUCTURE

TECHNICAL FIELD

The present invention relates to a greening structure, which is provided with a planting portion laid on a water-reserving portion for reserving water, to cultivate plants and which is placed on a pavement to form a greening area and, more particularly, to a greening structure for supporting an external force to be loaded mainly on the planting portion.

BACKGROUND ART

In the prior art, an artificial ground of Patent Publication 1 (JP-A-2002-4482) is disclosed as the technique relating to the structure for supporting the external force to be loaded on the planting portion. This artificial ground is constructed by laying a moisture-preventing sheet on the surface of a concrete layer, by arranging pallets on the surface of the sheet, by protruding a plurality of pins upward from the upper faces of the pallets, by arraying the plural pins at a spacing for receiving the lower faces of the shoes of a person walking on the pallets, and by laying soil on the pallets substantially up to the height of the pins.

Another relating technique is directed to a planting mat to be laid on the artificial ground, as disclosed in Patent Publication 2 (JP-A-11-289876). This planting mat is made by erecting post-shaped members of such a height in a cell recessed to have an upper portion opened and formed to have a water supply port near the bottom as not to exceed the upper end portions of the side walls of the cell.

In Patent Publication 3 (JP-A-10-98950), there is disclosed as another relating technique a lawn root protector, which is made by welding pipe posts in a staggered arrangement to an upper plate, by forming holes between the pipe posts, by attaching enclosing plates upward at a height substantially equal to that of the pipe posts, to the four sides of the upper plate, and by disposing a grid-shaped base plate at the lower portion of the upper plate so as to support the upper plate.

A pot is disclosed in Patent Publication 4 (JP-A-2001-57817) as a technique relating to the construction, in which a water-reserving unit for reserving water below a planting unit filled with soil or the like for cultivating plants. This pot is provided with: a water-reserving pot member capable of reserving water; a planting pot member laid on the water-reserving pot member for the plants; water supply means made of cloth for supplying water stored in the water-reserving pot member into the planting pot member; and a support member for supporting the bottom portion of the pot member on at least the pot member and the water-reserving pot member.

In another relating technique of Patent Publication 5 (JP-UM-A-61-20140), there is disclosed a pot receiving dish, in which a protrusion is formed of a number of needles in the recess of the dish body for supporting the bottom of the pot.

In another relating technique of Patent Publication 6 (JP-A-2001-78582), there is disclosed a plant cultivating container relating to the construction, in which a water-reserving unit is disposed below a planting unit for plants for supporting an external force to be loaded on the planting unit. The plant-cultivating container disclosed is constructed of a bottom plate and a circumferential wall, and has its upper face opened. In this plant-cultivating container, a unit placing space is formed in an upper portion of the container, and a breeding material filled space is formed in the lower portion. A plurality of post-shaped members for supporting the unit material placed in the unit placing space are erected from the bottom plate, and legs are formed downward from the bottom plate. The plant-cultivating container is laid on a water-reserving bath tray.

DISCLOSURE OF THE INVENTION

Here, the techniques of Patent Publications 1 to 3 are effective for supporting the external force such as a treading pressure to be loaded on the planting unit. However, since they do not have a structure for reserving water and feeding the planting unit such as a pallet for cultivating plant with water, frequent irrigations are required to raise the cost for the water service uneconomically. Moreover, no rainfall continues for a long time when it is necessary to supply the plants with water. Without any rainfall for a long time, the water service may be restricted so that water cannot be supplied to the plants and thereby the plants may die. Moreover, the rainwater is utilized only for keeping itself in the soil of the planting unit. Thus, it cannot be said to make effective use of the rainwater.

As in the techniques of Patent Publications 3 and 4, therefore, a greening structure is laid for feeding the planting unit with the water reserved in the water-reserving unit, thereby to form a greening area on the roof or the like. On the other hand, the techniques of Patent Publications 3 and 4 is made excellent for eliminating the aforementioned drawbacks by providing the water-reserving unit. In case, however, the external force is loaded on the planting unit or in case a person trespasses on the planting unit to apply the treading pressure, the soil is hardened by the external force such as the treading pressure to damage the plant roots.

The drawbacks inherent in the techniques of Patent Publications 1 to 5 can be solved to some extent by the plant cultivating container and the water-reserving bath tray disclosed in Patent Publication 6, which is provided with a water-reserving unit below the planting unit for supporting the external force loaded on the planting unit. In the plant cultivating container, legs protruding downward from the bottom plate exist at positions having no relation to the lower ends of the post-shaped members so that the external force loaded downward is received only by the bottom plate of the plant cultivating container through the post-shaped members. Incase the person walks in the plant-cultivating container, the bottom plate warps downward to raise drawbacks that the container is deteriorated in the treading feel and that the container becomes inferior in the supporting strength and the stability. These drawbacks become more prominent in case the side walls of the water-reserving bath tray or the legs of the plant cultivating container are formed so high as to increase the water reserved in the water-reserving bath tray.

The present invention contemplates to eliminate the aforementioned drawbacks and has an object to provide a greening structure, which includes a planting unit at its upper portion and a water-reserving unit at its lower portion, which can support an external force loaded on the planting unit, reliably on a pavement, which is excellent in a supporting strength and a stability and which can provide a satisfactory treading feel.

According to the invention, there is provided a greening structure comprising a plant-cultivatable planting portion on a water-reserving portion and laid on a pavement for forming a greening area, wherein the improvement comprises post-shaped members provided substantially consecutively from a portion where an external force loaded on the planting portion is directly received, to the bottom of the water-reserving portion or to the pavement, so that the external force is received on the pavement through the post-shaped members. For example, the greening structure including the water-reserving portion having a water-retaining space, and the plant cultivatable planting portion placed on the water-reserving portion is provided with either the post-shaped members made substantially consecutive from the vicinity of the upper face of the planting portion to the pavement or the like, or the post-shaped members substantially depending from the vicinity of the upper face of the planting portion to the pavement or the like, so that the external force on the planting portion is supported on the pavement through the post-shaped members. Here, the invention contains the construction, in which the planting portion and the water-reserving portion are made so separate as can be removed, or in which the planting portion and the water-reserving portion are made integral.

In a greening structure of the invention, moreover, the substantially consecutive post-shaped members include: first post-shaped members disposed upward from the bottom of the planting portion; and second post-shaped members disposed downward from the bottom of the planting portion. The external force to be loaded on the planting portion is supported on the pavement through the first post-shaped members and the second post-shaped members. Moreover, a greening structure is preferred to further comprise: a retaining structure for retaining the vicinity of the bottom of the water-reserving portion and the vicinities of the lower ends of the second post-shaped members.

In a greening structure of the invention, moreover, the substantially consecutive post-shaped members are erected upward from the bottom face of the water-reserving portion to the portion where the external force is directly received, so that the external force to be loaded on the planting portion is supported on the pavement through the post-shaped members. These post-shaped members are erected upward from the bottom of the water-reserving portion, for example, and extend to the vicinity of the upper end of the planting portion.

In a greening structure of the invention, moreover, the substantially consecutive post-shaped members include: first post-shaped members erected upward from the bottom of the planting portion; and second post-shaped members erected upward from the bottom of the water-reserving portion. The external force to be loaded on the planting portion is supported on the pavement through the first post-shaped members and the second post-shaped members. Moreover, it is preferred that a greening structure further comprises a retaining structure for retaining the vicinity of the bottom of the planting portion and the vicinities of the top ends of the second post-shaped members.

In a greening structure of the invention, moreover, the substantially consecutive post-shaped members or the first post-shaped members or the second post-shaped members have no hollow portion.

Here, the invention contains the planting portion, which is formed into a general box shape having side walls and a bottom, which is provided with the post-shaped members provided from the bottom, in which the post-shaped members are formed lower than the upper end of the side walls, and in which the portions of the side walls higher than the upper ends of the post-shaped members are made flexible or thin.

The greening structure of the invention or the greening facilities having one or more greening structures laid on the pavement can receive or support the external force reliably on the pavement through the substantially consecutive post-shaped members from the portion, where the external force loaded on the planting portion is directly received, to the bottom face of the water-reserving portion or the pavement. As a result, the greening structure is high in the supporting strength and excellent in the stability and can give a satisfactory treading feel. In case the planting portion is a box-shaped container having its upper face opened, for example, such a force of the external force as to be received by the container bottom can be reduced by the substantially consecutive post-shaped members, and most of the external force can be reliably received by the pavement. Moreover, the container base can be prevented in advance from being deformed and is hardly warped even if the external force is applied, so that a remarkably excellent treading feel can be obtained.

Moreover, the substantially consecutive post-shaped members are constructed of the first post-shaped members disposed upward from the bottom of the planting portion and the second post-shaped members disposed downward. As a result, the water-reserving portion can be formed merely into a generally box-shaped water-reserving bath so that its manufacturing cost can be lowered. Moreover, the planting portion is easily removed, when intended so, from the water-reserving portion so that the greening structure, the greening facilities and the greening area can be easily rearranged for recreation. If the retaining portions for retaining the lower ends of the second post-shaped members or their vicinities are disposed near the bottom of the water-reserving portion, the second post-shaped members or the planting portion and the water-reserving portion can be positioned easily and reliably.

In another example, the substantially consecutive post-shaped members are erected upward from the bottom of the water-reserving portion to the portion where the external force is directly received. Therefore, the planting portion to be used can be exemplified by a container of a simple structure having a top-opened general box shape and equipped in the bottom with holes for inserting the post-shaped members therethrough. Thus, it is possible to reduce the cost for manufacturing the planting portion. Still moreover, the water-reserving portion is equipped directly with the post-shaped members so that it can support the external force on the planting portion more strongly and stably.

In another example, moreover, the substantially consecutive post-shaped members are composed of the first post-shaped members erected upward from the bottom of the planting portion and the second post-shaped members erected upward from the bottom of the water-reserving portion. As a result, the planting portion and the water-reserving portion can be made to have basically identical structures, and only the planting portion can be formed by driving the water holes later, so that the cost for manufacturing the greening structure can be reduced. Moreover, the works to remove the planting portion from the water-reserving portion can be facilitated to facilitate the rearrangement of the greening structure, the greening facilities or the greening area for recreation. If the retaining portions for retaining the upper ends of the second post-shaped members or the vicinities of the same are disposed near the bottom of the planting portion, the second post-shaped members or the water-reserving portion and the planting portion can be positioned easily and reliably.

If, moreover, the post-shaped members are made to have a structure having no hollow portion or a solid structure, it is possible to strengthen the post-shaped members and to eliminate the wasteful volume due to the presence of the hollow portions. By minimizing the volume of the post-shaped members in the planting portion, for example, the planting portion can be charged with the breeding material such as much soil, and the area near the top faces of the post-shaped members where the plants are difficult to grow can be narrowed to breed the plants satisfactorily. By minimizing the volume of the post-shaped members in the water-reserving portion, moreover, more water can be stored in the water-reserving portion thereby to spare the water service and to make more effective use of the rainwater.

By using the greening structure or the greening facilities according to the greening structure, moreover, even the greening structure having the planting portion at its upper portion and the water-reserving portion at its lower portion can support the external force loaded on the planting portion, reliably on the pavement, thereby to provide the effects that the excellent supporting strength and stability can be obtained, and that the satisfactory treading feel can be obtained. Especially by the substantially consecutive post-shaped members, the weight of the planting portion charged with the breeding material and the load by the external force such as the treading pressure on the planting portion can be supported stably and reliably on the pavement. It is, therefore, possible to prevent the bottom face of the planting portion from being broken by the load on the post-shaped members and to prevent the water-reserving portion from being broken. It is also possible to eliminate the bad treading feel, which might otherwise be felt as if the planting portion were depressed due to the deformation of the planting portion bottom when the planting portion is trodden. Moreover, the post-shaped members can prevent the breeding material of the planting portion from being solidified and can relieve the damage on the roots of the plants.

BEST MODE FOR CARRYING OUT THE INVENTION

The invention will be described in connection with its embodiments with reference to the accompanying drawings, but it should not be limited to the following embodiments. These embodiments relate to a greening structure, in which a planting portion is placed on a water-reserving portion and in which the water of the water-reserving portion is sucked into a planting portion by suction means so that plants can be cultivated. The greening structure is preferably placed by one or a plurality on an artificial ground such as a roof, a terrace or a porch thereby to construct greening facilities or a greening area.

Figure 1:
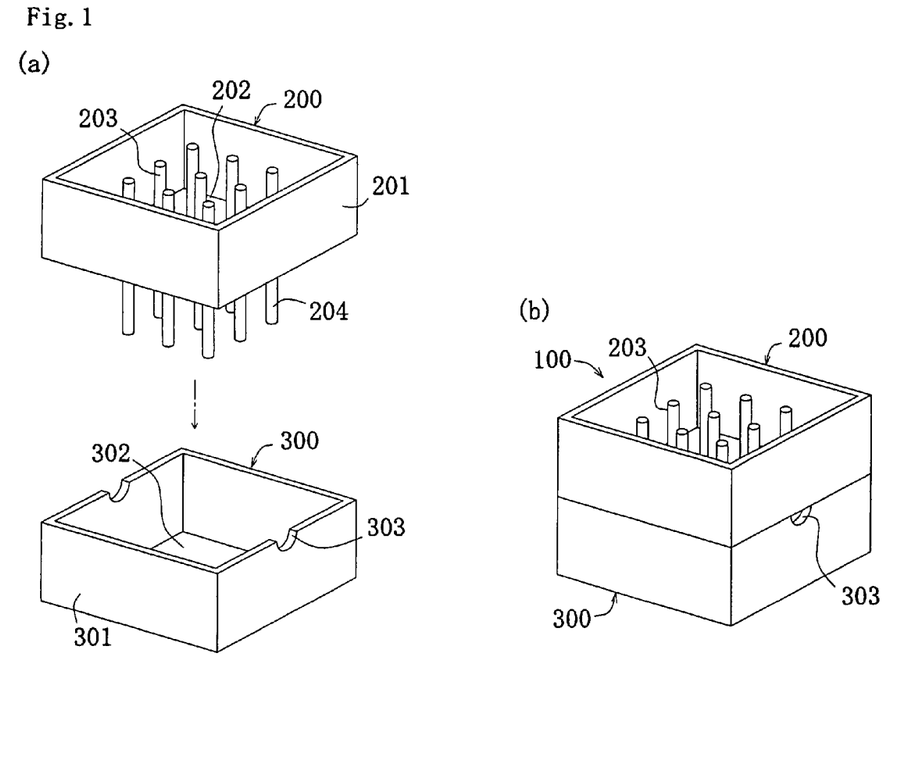
FIG. 1(a) is a perspective explanatory view of a greening structure of a first embodiment with its planting portion and a water-reserving portion being separated.
FIG. 1(b) is a perspective view of the greening structure of the first embodiment.
Figure 2:
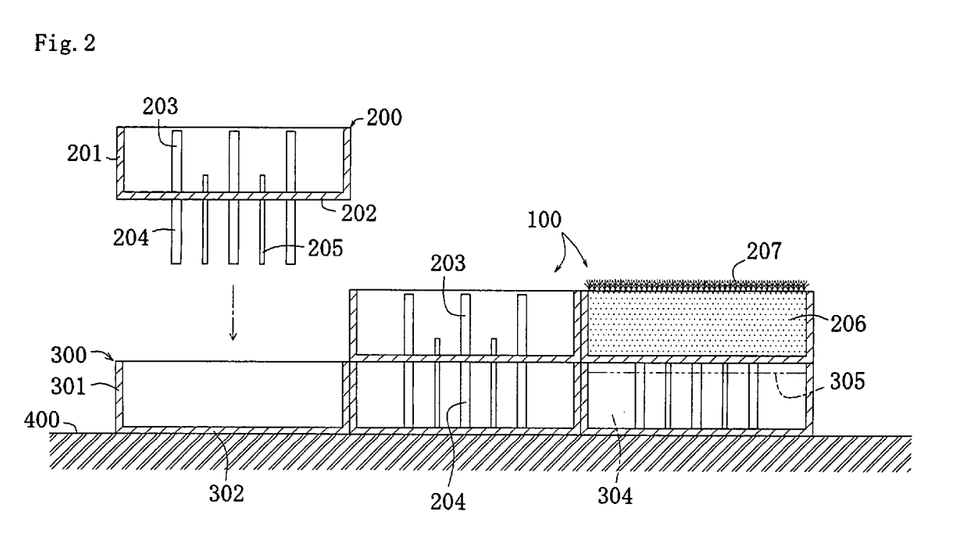
FIG. 2 is a sectional explanatory view showing greening facilities according to the greening structure of the first embodiment.

In a first embodiment, as shown in FIGS. 1 and 2, a greening structure 100 includes a planting portion 200 and a water-reserving portion 300, the planting portion 200 of which is placed on the water-reserving portion 300. The planting portion 200 is composed of side walls 201 and a bottom 202 and is formed generally into a box having a generally square shape in a top plan view and an open top. The water-reserving portion 300 is also composed of side walls 301 and a bottom 302 and is formed generally into a box having a generally square shape in a top plan view and an open top. The planting portion 200 and the water-reserving portion 300 are formed to have substantially equal sizes.

In the planting portion 200, the bottom 202 is drilled to form water/air holes (although not shown) for discharging excess water into the water-reserving portion 300 and for passing air. Moreover, first post-shaped members 203 having a generally circular shape or a generally cylindrical shape in a top plan view are erected so long from the bottom 202 at positions other than the drilled areas of the water/air holes as to extend to positions slightly lower than the upper ends of the side walls 201. At the same positions in the top plan view as those of the first post-shaped members 203, on the other hand, second post-shaped members 204 having a generally circular or generally cylindrical shape in a top plan view are extended downward from the bottom 202. The second post-shaped members 204 are formed to have such a length or a slightly shorter length as to abut at their lower ends against the bottom 302 of the water-reserving portion 300, when the planting portion 200 is placed on the water-reserving portion 300.

Here, both the first post-shaped members 203 and the second post-shaped members 204 of this embodiment are made to have substantially solid cylindrical post shapes and substantially equal diameters. Moreover, the first post-shaped members 203 and the second post-shaped members 204 are precisely or substantially aligned in the vertical direction or disposed to have their center lines precisely or substantially aligned with each other.

As shown in FIG. 2, in the planting portion 200, moreover, the bottom 202 is drilled to have (not-shown) holes for inserting water-absorbing members 205 therethrough, so that the water 304 in the water-reserving portion 300 may be introduced into the planting portion 200 by the capillary phenomena of the water-absorbing members 205 inserted through those holes, thereby to cultivate the plants satisfactorily in the planting portion 200.

In the water-reserving portion 300, recesses 303 are formed in the upper ends of the side walls 301 for discharging the excess water in the water-reserving portion 300 to the outside. As a result, the water surface 305 or the water level of the water 304 in the water-reserving portion 300 is prevented by the recesses 303 from exceeding a predetermined height (i.e., the height of the lower ends of the recesses 303), so that an air layer is always kept between the planting portion bottom 202 and the upper water level limit of the water 304 in the water-reserving portion 300. Moreover, the air in the air layer is guided into the planting portion 200 through the aforementioned water/air holes formed in the bottom 202 of the planting portion 200.

In the greening structure 100 having the planting portion 200 laid on the water-reserving portion 300, the lower ends of the second post-shaped members 204 of the planting portion 200 are in abutment against the upper face of the bottom 202 of the water-reserving portion 300, and the side walls 201 of the planting portion 200 are in abutment against the upper ends of the side walls 301 of the water-reserving portion 300. As a result, the openings formed by the recesses 303 of the water-reserving portion 300 and the lower ends of the side walls 201 of the planting portion 200 function as drainage openings.

When the greening structure 100 is to be used, the water-reserving portion 300 is placed on a pavement 400, as shown in FIG. 2 for example. The planting portion 200 is laid on the water-reserving portion 300 and is filled therein with a breeding material 206. Suitable plants 207 such as lawn, sedam, mosses, pole climbing plants, trees or flowers are planted in or on the breeding material 206, and the water-reserving portion 300 is filled, if necessary, with the water 304. As shown in FIG. 2, the pavement 400 on a roof or the like is paved with the plural greening structures 100 thereby to construct the greening facilities.

In case the greening structures 100 or the greening facilities are to be placed on the roof or the like, it is preferred to use the breeding material 206 of a light weight such as perlite, vermiculite, peat moss, bark compost, chafcon, wood rotting organic, zeolite, sludges from a sewage or water treatment plant, or burned ash of the sludge. Moreover, the breeding material 206 can also be exemplified by selecting several kinds of those materials, by selecting silicate of china clay for preventing the root rot suitably according to the kinds of the plants 207 and the environment, by blending them in a good balance for improving the water retentivity and the drainage, or by using a light breeding material such as a fibrous material including a sponge or coconut shell.

Figure 3:
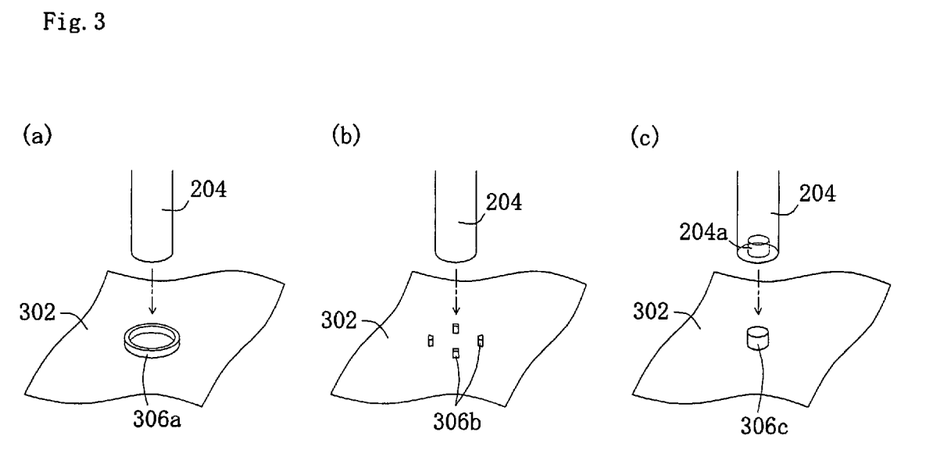
FIGS. 3(a) to 3(c) are perspective explanatory views showing structural examples for retaining a second post-shaped member with retainers.

If the water-reserving portion 300 is equipped with a retaining portion for retaining or engaging the lower end of the second post-shaped member 204, as shown in FIG. 3, it is preferred because positioning of the planting portion 200 or the second post-shaped member 204 or the longitudinal or transverse movements of the same can be regulated. For example, a retainer 306a of FIG. 3(a) is a circular ridge having a similar shape to and a slightly larger size than that of the bottom face or lower end face of the second post-shaped member 204 so that the lower end of the second post-shaped member 204 may be fitted and retained in the circular ridge of the bottom 302. On the other hand, the retainer 306b of FIG. 3(b) is four (preferably three or more) protrusions formed on the water-reserving portion bottom 302. These protrusions are arranged to receive the lower end of the second post-shaped member 204 among themselves so that the second post-shaped member 204 is fitted and retained between those protrusions. On the other hand, a retainer 306c of FIG. 3(c) is a protrusion mounted on the water-reserving portion bottom 302. A recess 204a for receiving that protrusion is formed in the bottom of the second post-shaped member 204. This protrusion is fitted in the recess 204a thereby to retain the lower end of the second post-shaped member 204. However, it is possible to use other suitable retainers or retaining structures.

With the planting portion 200 being placed on the water-reserving portion 300, moreover, the side walls 201 of the planting portion 200 and the side walls 301 of the water-reserving portion 300 are positioned at identical positions in a top plan view or to have identical side faces. Even if an external force such as the depression of a pedestrian is applied to the side walls 201 in case the post-shaped members 203 and 204 are absent near the side walls 201 and 301, the external force such as the depression can be linearly guided through the side walls 201 and 301 to the pavement 400 so that the external force or its substantial portion can be preferably received by the pavement 400.

The greening structure 100 of the first embodiment or the greening facilities can guide the external force such as the depression from above the planting portion 200, through the first post-shaped members 203 and the second post-shaped members 204 of the generally straight shape, linearly to the water-reserving portion bottom 302 in contact or close contact with the pavement 400. As a result, all or most of the external force can be reliably supported on the pavement 400 so that a high supporting strength or stability can be obtained to lower the probability for the planting portion 200 or the water-reserving portion 300 to break. Moreover, the first post-shaped members 203 and the second post-shaped members 204 exist at the generally identical positions in the top plan view the first post-shaped members 203 can be prevented from being sunk or the planting portion bottom 202 can be prevented from being warped by the external force loaded on the first post-shaped members 203, thereby to retain the treading feel satisfactory.

Figure 4:
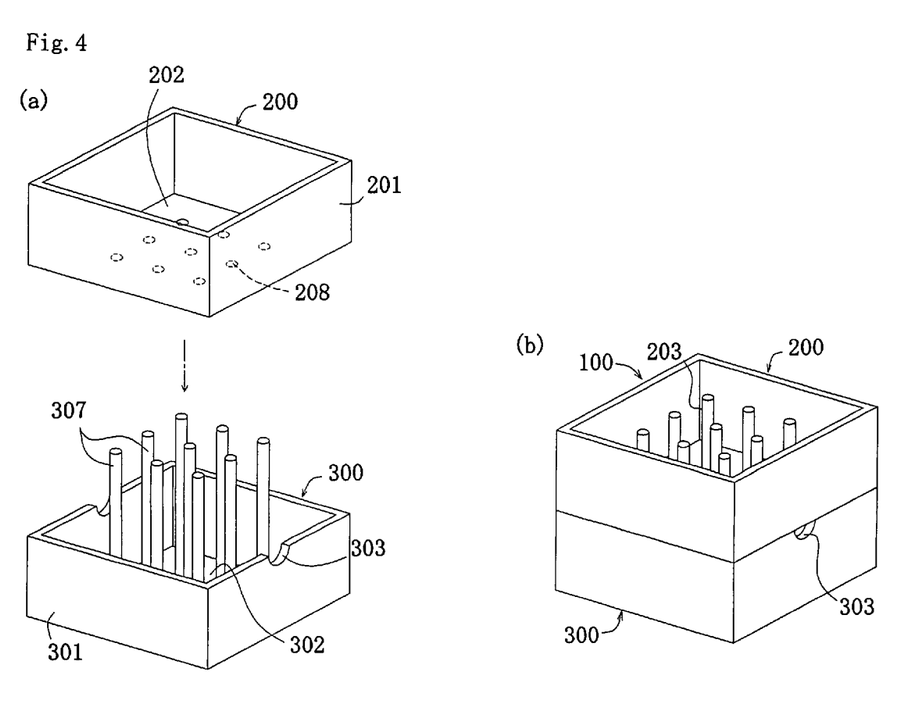
FIG. 4(a) is a perspective explanatory view of a greening structure of a second embodiment with its planting portion and a water-reserving portion being separated.
FIG. 4(b) is a perspective view of the greening structure of the second embodiment.
Figure 5:
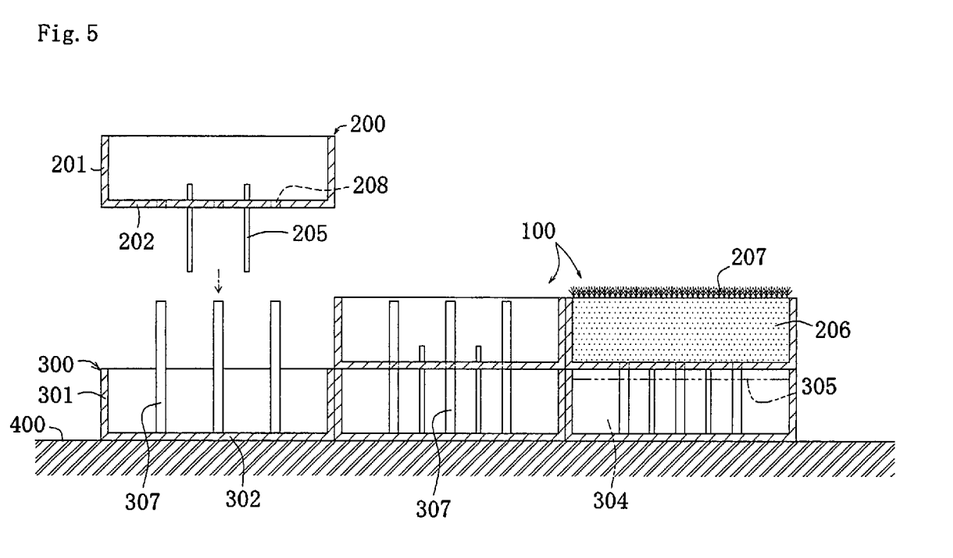
FIG. 5 is a sectional explanatory view showing greening facilities according to the greening structure of the second embodiment.

Next, a second embodiment of the invention is described in detail on the portions different from the aforementioned ones of the first embodiment. The greening structure 100 of the second embodiment is also constructed by placing the planting portion 200 on the water-reserving portion 300, as shown in FIG. 4 and FIG. 5. The planting portion 200 is not equipped with no post-shaped member, but the water-reserving portion 300 is equipped with a plurality of generally circular or generally cylindrical post-shaped members 307. These post-shaped members 307 are vertically protruded upward so higher from the bottom 302 of the water-reserving portion 300 than the upper end of the side walls 301. Moreover, the bottom 202 of the planting portion 200 is drilled to have post-shaped member holes 208 having substantially the same shape and size as those of the post-shaped members 307 in the top plan view at positions of the post-shaped members 307. When the planting portion 200 is placed on the water-reserving portion 300, the post-shaped members 307 are inserted through and positioned in the post-shaped member holes 208 so that their upper ends are located at the upper ends of the side walls 201 of or near the upper face of the planting portion 200. The remaining constructions are similar to those of the first embodiment.

By employing either the greening structure 100 of the second embodiment or the greening facilities according to the greening structure 100, the advantages of the first embodiment are enjoyed and the structure of the planting portion 200 can be simplified so that the cost can be lowered. Moreover, the post-shaped members 307 are inserted through the post-shaped member holes 208 so that the planting portion 200 can be reliably positioned with respect to the water-reserving portion 300 and can be prevented in advance from moving in the longitudinal and transverse directions.

Figure 6:
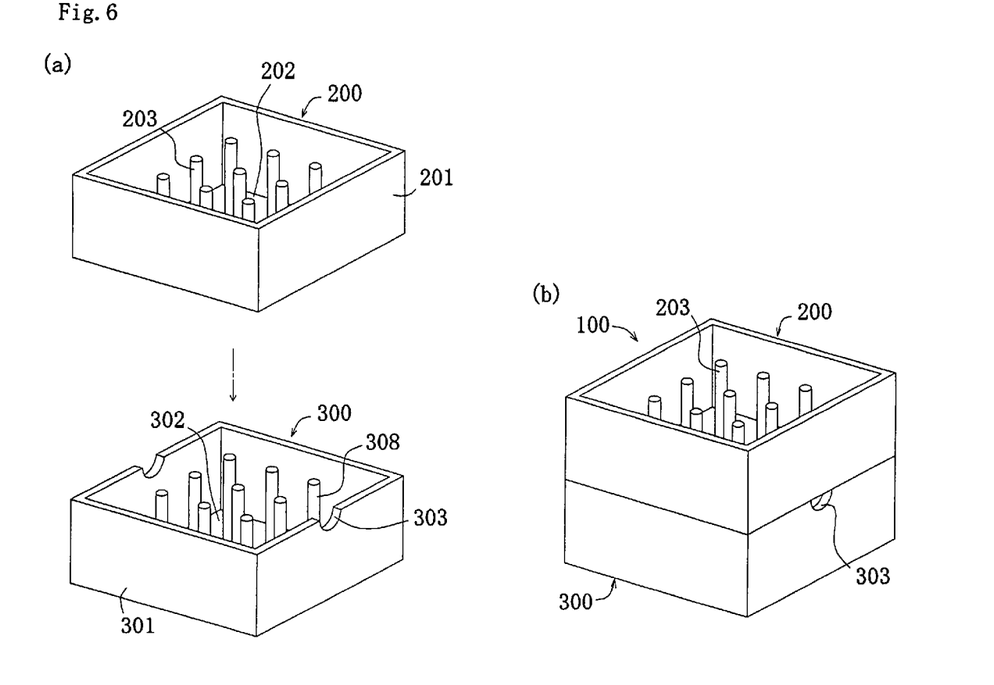
FIG. 6(a) is a perspective explanatory view of a greening structure of a third embodiment with its planting portion and a water-reserving portion being separated.
FIG. 6(b) is a perspective view of the greening structure of the third embodiment.
Figure 7:
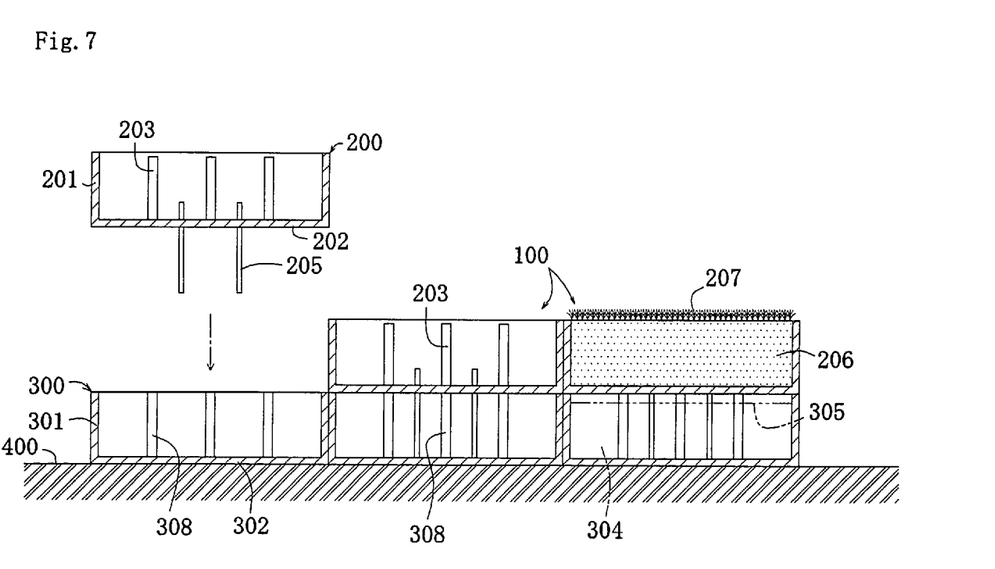
FIG. 7 is a sectional explanatory view showing greening facilities according to the greening structure of the third embodiment.

Next, a third embodiment of the invention is described in detail on the portions different from the aforementioned ones of the foregoing first and second embodiments. The greening structure 100 of the third embodiment is also constructed by placing the planting portion 200 on the water-reserving portion 300, as shown in FIG. 6 and FIG. 7. As in the first embodiment, however, the planting portion 200 is equipped with the first post-shaped members 203 protruding vertically upward from the bottom 202 to the vicinity of the upper ends of the side walls 201 but not with the post-shaped members downward of the bottom 202. On the other hand, the water-reserving portion 300 is equipped with second post-shaped members 308 having a generally circular or generally cylindrical shape in a top plan view and protruding vertically to the upper end positions of the side walls 301. With the planting portion 200 being placed on the water-reserving portion 300, the second post-shaped members 308 have their upper ends abutting against the lower face of the bottom 202 of the planting portion 200 and positioned at positions substantially identical to those of the lower ends of the first post-shaped members 203 of the planting portion 200. The remaining constructions are identical to those of the foregoing first and second embodiment. Effects similar to those of the foregoing first embodiment can be obtained by employing the greening structure 100 of the third embodiment and the greening facilities of the greening structure 100.

Although the greening structures 100 of the first to third embodiments of the invention and the greening facilities according to the greening structures 100 have been described hereinbefore, the invention should not be limited to the first to third embodiments but can be variously expanded and modified.

In all the first, second and third embodiments, for example, the bottom 302 of the water-reserving portion 300 and/or the bottom 202 of the planting portion 200 may be equipped with legs protruding downward. Especially if the water-reserving portion 300 is equipped with the legs, the bottom 302 or the like of the water-reserving portion 300 can be kept at a predetermined spacing from the pavement 400 thereby to exhibit an effect to improve the drainage.

Figure 8:
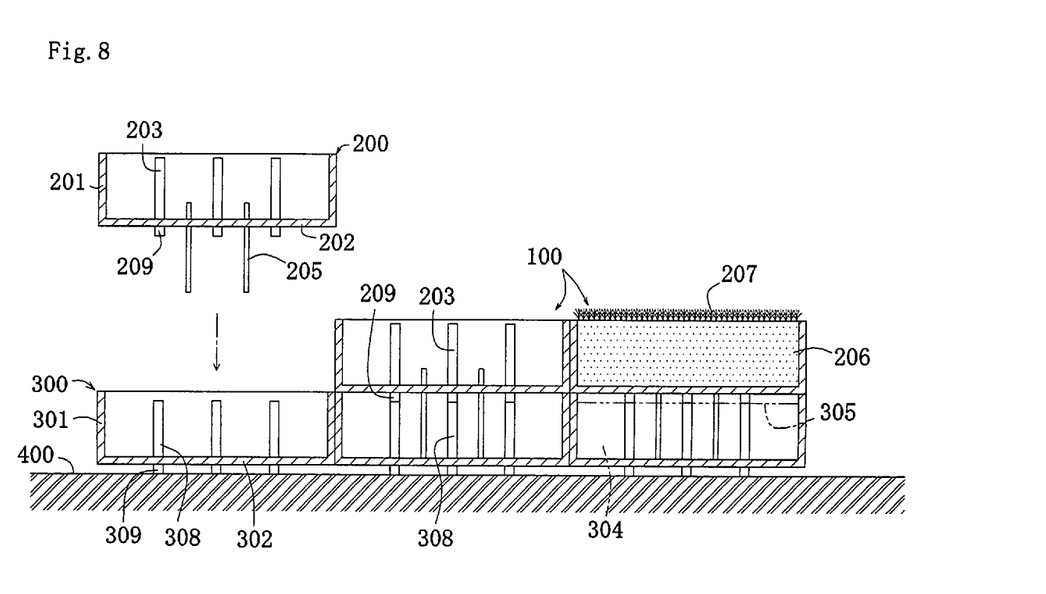
FIG. 8 is a sectional explanatory view showing greening facilities according to the greening structure of the fourth embodiment.

As a specific structural example, there is shown in FIG. 8 the greening structure 100 of a fourth embodiment, in which the planting portion 200 and the water-reserving portion 300 having basic constructions similar to those of the greening structure 100 of the third embodiment are equipped with the legs. The greening structure 100 of the fourth embodiment is equipped with legs 209 having a generally circular or cylindrical shape in a top plan view and protruding downward of the bottom 202 of the planting portion 200, and with legs 309 protruding downward from the bottom 302 of the water-reserving portion 300. The first post-shaped members 203, the legs 209, the second post-shaped members 308 and the legs 309 are disposed at the same corresponding positions in the top plan view. Moreover, the height of the upper ends of the second post-shaped members 308 is reduced by the protrusion of the legs 209 of the planting portion 200, so that the upper end faces of the second post-shaped members 308 abut against the lower end faces of the legs 209 when the planting portion 200 is laid on the water-reserving portion 300.

By the construction having the legs of the fourth embodiment or the like thus far described, a predetermined drainage space can be formed between the pavement 400 and the bottom 302 of the water-reserving portion 300, so that a continuous drainage space can be formed all over the greening area. As a result, the excess water to overflow from the water-reserving portion 300, for example, can be reliably drained to the outside of the greening area thereby to eliminate a drawback that the water might otherwise be reserved reside due to a rainfall outside of the greening structure 100 on the high gradient side of the greening facilities. Here, the structure may also be modified to the contrary such that the planting portion bottom 202 is recessed whereas the second post-shaped members 308 erected from the water-reserving portion bottom 302 are made higher by the depth of the recesses than the side walls 301, so that the upper ends of the second post-shaped members 308 are fitted and retained in the aforementioned recesses.

In case, moreover, the lower ends of the legs 209 of the planting portion 200 are disposed at the upper ends of the second post-shaped members 308, the upper ends of the second post-shaped members 308 are retained or engaged on or near the bottom 202 of the planting portion 200 by forming the retainers or the retaining structures at the lower ends of the legs 209 and at the upper ends of the second post-shaped members 208. Then, the planting portion 200 can be positioned with respect to the water-reserving portion 300 so that the movements of the planting portion 200 in the longitudinal and transverse directions can be preferably prevented in advance.

Figure 9:
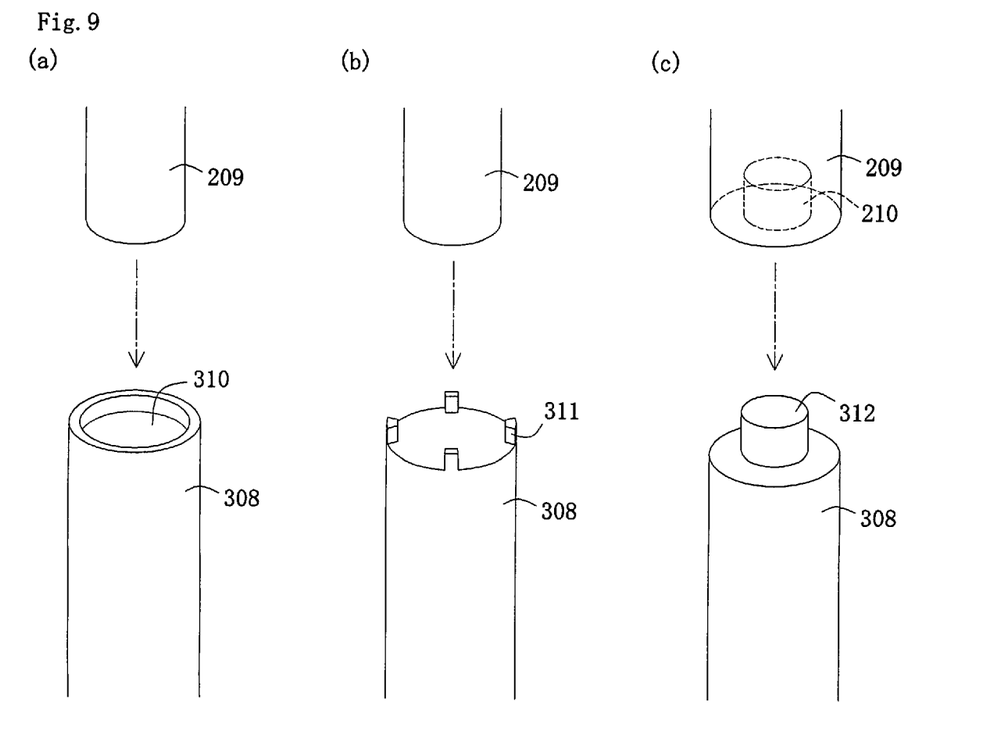
FIGS. 9(a) to 9(c) are perspective explanatory views showing structural examples for retaining legs.

The aforementioned retaining structure is arbitrary and can be exemplified by: a construction, as shown in FIG. 9(a), in which a recess 310 generally similar to but slightly larger than the bottom of the leg 209 of the planting portion 200 is formed on the upper end face of the second post-shaped member 308 to retain the leg 209 of the planting portion 200 inserted or fitted therein; a construction, as shown in FIG. 9(b), in which three or more protrusions 311 (e.g., four protrusions 311) are disposed at a generally predetermined spacing on the outer circumference of the upper end face of the second post-shaped member 308 thereby to retain the leg 209 of the planting portion 200 between or in the circumferentially disposed protrusions 311 inserted or fitted therein; or a construction, as shown in FIG. 9(c), in which a protrusion 312 is disposed on the upper end of the second post-shaped member 308 whereas a recess 210 is formed in the lower end of the leg 209 of the planting portion 200 thereby to retain the protrusion 312 inserted or fitted therein.

Moreover, the shapes of the post-shaped members 203, 204, 307 and 308 and the legs 209 of the embodiments thus far described are generally circular in the top plan view but should not limited to those shapes. However, the shapes should not be limited thereto but can be formed into various shapes such as a polygonal shape of a generally square or triangular shape, or an elliptic shape in the top plan view and may preferably be solid. The post-shaped members and the legs may preferably have a generally cross, L-letter or I-letter shape in the top plan view and may more preferably be solid.

Specifically, the post-shaped member 203 is formed into a straight shape and/or made solid to have no hollow portion. In the case of the post-shaped member 203, 307 or the like in the planting portion 200, for example, it is possible to increase the charge of the breeding material 206, to increase the water retention by the breeding material 206, and to increase the volume of the space for the roots of the plants 207 to extend, thus breeding the plants 207 better. It is further possible to decrease the plane areas of the top portion or face or its vicinity of the post-shaped member 203 or the like, where the plants 207 are hard to grow, or to shorten the distance between the breeding materials 206 across the top faces of the post-shaped member 203 or the like thereby to cultivate more plants 207 better. In case the grounding plants such as the lawn is cultivated as the plants 207, the plants well ground the top face of the post-shaped member 203 or the like so that the plants 207 exist near the top face of the post-shaped member 203 or the like and the appearance is not deteriorated.

In case, on the other hand, the post-shaped members 307, 308, 204 or the like in the water-reserving portion 300 is formed into the aforementioned shape, the upper limit of the water to be reserved can be increased or maximized to spare the cost for the water service or to reuse the rainwater.

If the top plan area and/or the number of the post-shaped members 203 or the like in the planting portion 200 is enlarged, the distance between the post-shaped members 203 or the like in the planting portion 200 can be so shortened that the tools or the like such as the wheels of a lawn mower to be used over the planting portion 200 cannot enter. If the top plan area and/or the number of the post-shaped members 308 or the like in the water-reserving portion 300 is reduced, the quantity of water to be reserved can be increased to lower the manufacturing cost satisfactorily. In the water-reserving portion 300, moreover, the post-shaped members 308 or the like corresponding to all or some of the post-shaped members 203 or the like of the planting portion 200 may be made consecutive from the pavement 400 to the bottom 302. It is, therefore, arbitrary to enlarge the top plan area and/or the number of the post-shaped members 203 and so on in the planting portion 200 and to reduce the top plan area and/or the number of the post-shaped members 308 and so on in the planting portion 300. In addition, the constructions thus far described may be suitably combined.

Figure 10:
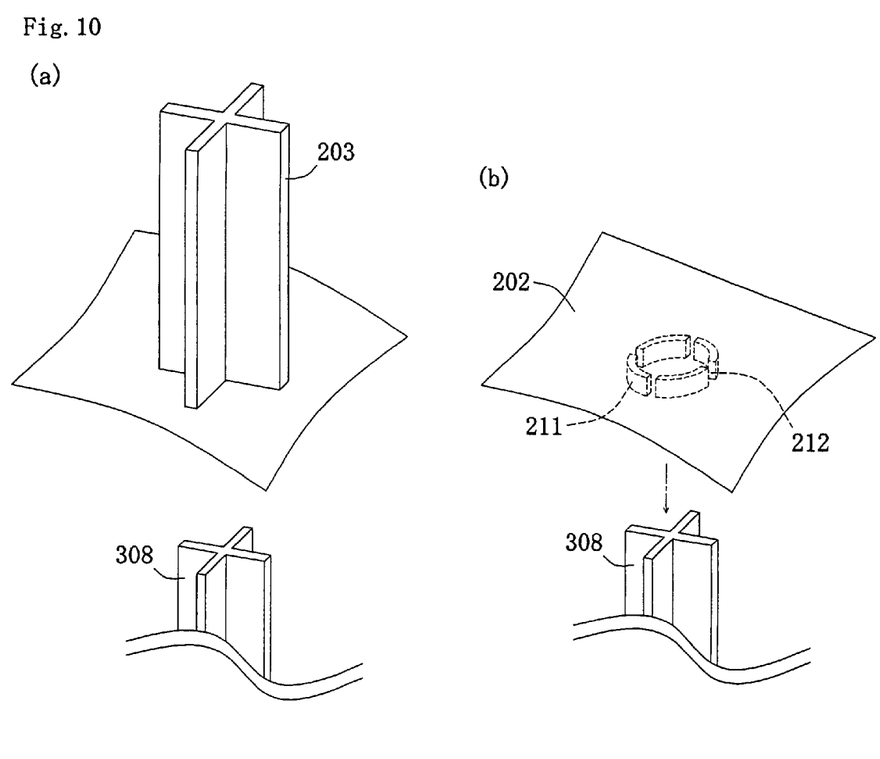
FIG. 10(a) is a perspective explanatory view showing another structural example for retaining a second post-shaped member with retaining protrusions being omitted.
FIG. 10(b) is a perspective explanatory view with the first post-shaped member being omitted from FIG. 10(a)

An example of the post-shaped member of the aforementioned straight shape may be exemplified by the structure shown in FIG. 10.

The structure of FIG. 10 is made by forming the first post-shaped member 203 of the third embodiment into a general cross shape in a top plan view and by forming the second post-shaped member 308 into a general cross shape in a top plan view and in a slightly smaller size than that of the first post-shaped member 203. The planting portion 200 is equipped on its bottom 202 with retaining protrusions 211, which protrudes downward in a generally circular shape in a top plan view and which has grooves 212 formed to retain or fit the cross-shaped second post-shaped member 308, so that the second post-shaped member 308 is retained when it is fitted in or engages with the grooves 212 of the retaining protrusions 211. Here, FIG. 10(*a*) shows the structure having the retaining protrusions 211 omitted, and FIG. 10(*b*) shows the structure having the first post-shaped member 203 omitted. The structure thus far described can exhibit the positioning effect of the planting portion 200 more reliably than the retaining structure of FIG. 9. With only the planting portion 200, for example, the structure can be sufficiently employed because the retaining protrusions 211 of the generally circular shape function as the legs. As a result, a sufficient drainage space can be formed between the pavement 400 and the planting portion bottom 202.

In the foregoing embodiments, on the other hand, there have been shown the constructions, in which the plural post-shaped members 203, 204, 307 and 308, the legs 209 and so on are arranged at a predetermined spacing in the top plan view, e.g., at a predetermined spacing in three lines and in three rows in the top plan view. However, the post-shaped members 203 or the like, the legs 209 and so on may be erected in a staggered arrangement or may also be regularly or irregularly erected. Moreover, all the plural post-shaped members 203 or the like, the legs 209 and so on need not have an identical top plan shape or an equal area, but may be combined to have various shapes or areas, if necessary. If the post-shaped members 203 or the like are staggered, irregularly arranged or given the aforementioned combinations, for example, it is possible to eliminate the drawback that the planting portion 200 is obstructed by the wheels of the lawn mower thereby to make it difficult to turn the mower.

Moreover, the post-shaped members in the planting portion 200 and the post-shaped members in the water-reserving portion 300 can also be made to have different top plan views and different top plan areas. For example, the first post-shaped members 203 and the second post-shaped members 204 and 308 of the first and third embodiments may be made to have different top plan shapes and various combinations. Moreover, the number of post-shaped members to be erected may also have different numbers between the first post-shaped members 203 and the second post-shaped members 204 and 308. In the construction having the legs 209 or the like, moreover, the first post-shaped members 203, the second post-shaped members 308 and the legs may be different in number among themselves or between any two. The construction may be made such that it is equipped of at least its portion with the post-shaped members substantially continuing from the vicinity of the upper end of the planting portion 200 to the pavement 400 or the water-reserving portion bottom 302 so that the external force to be loaded by the planting portion 200 can be supported on the pavement 400 through the substantially consecutive post-shaped members.

In the case of the fourth embodiment having the legs 209, for example, the substantially consecutive post-shaped members may be formed in such a manner that the first post-shaped member 203 may also be equipped on its lower end face with the leg 209 at substantially the same positions in the top plan view as do not overlap partially or wholly in the top plan view but are slightly displaced from the aforementioned lower end face, so that the load to be loaded through the first post-shaped member 203 may be borne by the leg 209. For example, the invention contains the construction, in which the external force to be loaded on the planting portion 200 can be reliably supported by the pavement 400 or the water-reserving portion bottom 302, even in case the first post-shaped member 203 and the leg 209 are different and slightly offset in their top plan views.

Figure 11:
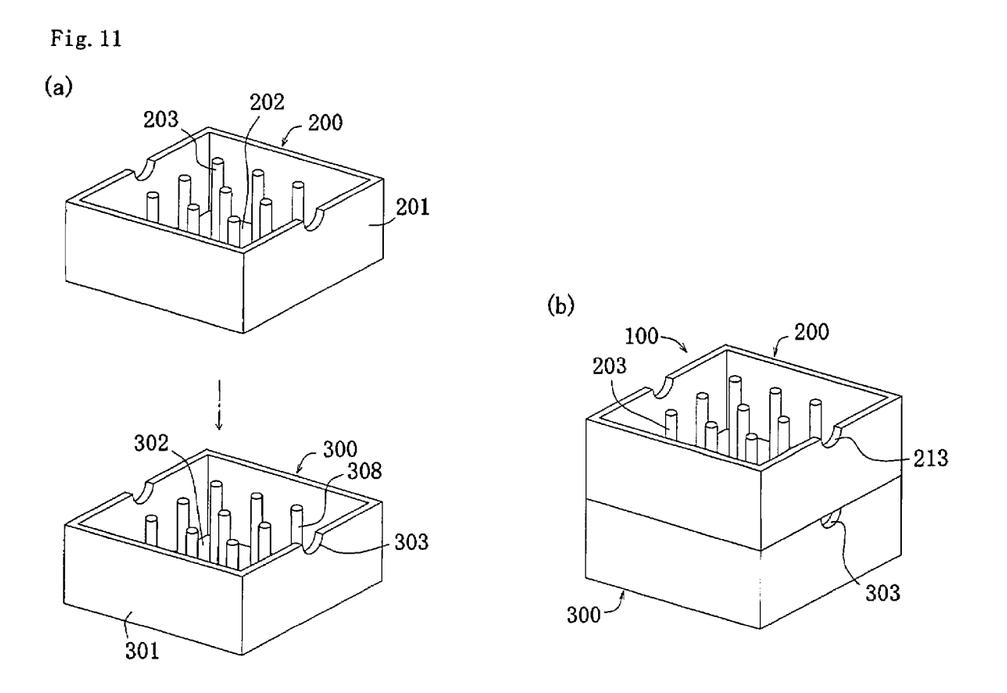
FIG. 11(a) is a perspective explanatory view of a greening structure of a fifth embodiment with its planting portion and a water-reserving portion being separated.
FIG. 11(b) is a perspective view of the greening structure of the fifth embodiment.

On the other hand, the position of the upper end of the first post-shaped member 203 or the like of the planting portion 200 is not made slightly lower than the upper ends of the side walls 201 of the planting portion 200 unlike the aforementioned embodiment but can also be set at a position equal to or higher than the upper end of the planting portion side walls 201. In a fifth embodiment of FIG. 11 or a modification of the third embodiment, on the other hand, the position of the upper end face of the first post-shaped member 203 or the like is made to have a height equal to that of the upper end of the planting portion side walls 201, and the planting portion 200 and the water-reserving portion 300 are made to have an identical construction. Then, the planting portion 200 and the water-reserving portion 300 may be manufactured at the common step, and the holes for the water-absorbing members 205 such as water-absorbing rods and the water/air holes may be formed at a later step only in the planting portion 200. Therefore, it is possible to simplify the manufacturing process and to lower the cost. In this construction, the planting portion 200 is also equipped with recesses 213, which correspond to the recesses 303 of the water-reserving portion 300. When the greening structures 100 are placed adjacent to each other, the recesses 213 provide communications with the adjoining other planting portion 200 so that the breeding material 206 is prevented from flowing out of the greening facilities.

In case the upper end faces of the first post-shaped members 203 of the planting portion 200 are positioned higher than the upper ends of the planting portion side walls 201, the uncomfortable treading feel, as might otherwise be caused at the foot backs by the planting portion side walls 201, can be eliminated when a person walks on the planting portion 200. In case, on the other hand, the upper end faces of the first post-shaped members 203 of the planting portion 200 are positioned lower than the upper ends of the planting portion side walls 201, the bad treading feel caused at the foot backs by the planting portion side walls 201 is given to the walker. Therefore, it is preferable that the bad treading feel can be eliminated if the planting portion side walls 201 are made partially or wholly of a flexible material or member or made thin. Here, those portions of the planting portion side walls 201, which are made of the flexible material or member, are limited to the upper end faces or the portions higher than their vicinities of the first post-shaped members 203 or the like or to the upper end portions of the planting portion side walls 201. Then, it is preferable to achieve the effect for preventing the strength reduction of the planting portion 200. Moreover, the treading feel is preferably improved if the top portions of the first post-shaped members 203 or the like of the planting portion 200 are formed into a rounded shape.

Moreover, the planting portion 200 and the water-reserving portion 300 of the greening structure 100 of the foregoing embodiments have been described on the constructions, in which they are individually formed into the container shape having the box-shaped upper shape, and in which the planting portion 200 and the water-reserving portion 300 correspond one-by-one to each other. However, the construction can be modified such that the planting portion 200 and the water-reserving portion 300 are not formed into the container shape, or such that the planting portion 200 and the water-reserving portion 300 do not correspond one-by-one to each other in the greening structure 100.

Figure 12:
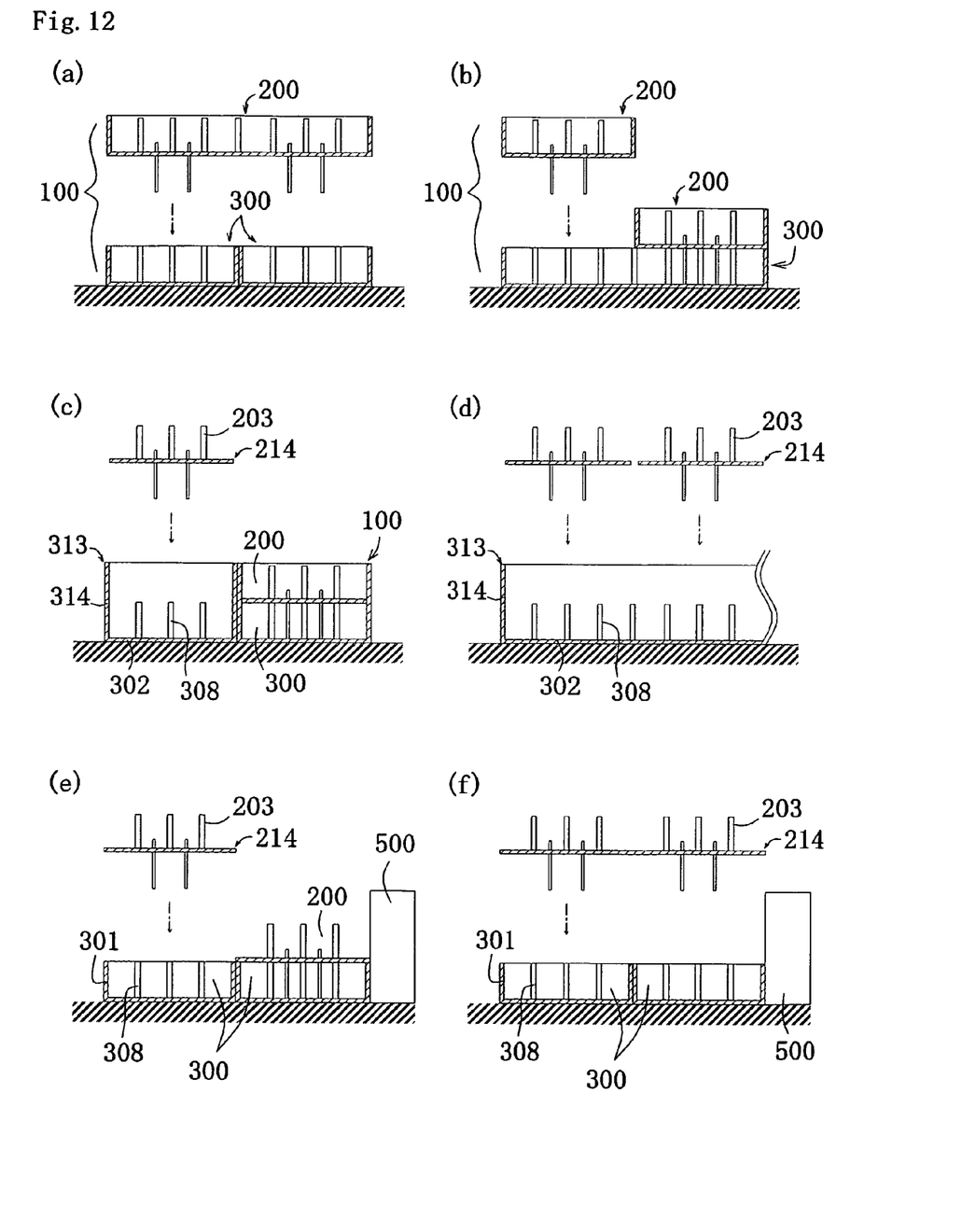
FIGS. 12(a) to 12(f) are sectional explanatory views showing greening structures, or greening structures and greening facilities of sixth to eleventh embodiments.

For example, the working steps can be reduced by the greening structure 100, in which one planting portion 200 is provided to correspond to two water-reserving portions 300, or a plurality of or four water-reserving portions 300 arranged by two in the longitudinal direction, as exemplified by a sixth embodiment of FIG. 12(a), or by the greening structure 100, in which a plurality of planting portions 200 are placed on one water-reserving portion 300, as exemplified by a seventh embodiment of FIG. 12(b).

Moreover, the structure of the planting portion 200 can be simplified by the greening structure 100, in which the side walls 314 of a water-reserving bath 313 are disposed high and in which a flat partition 214 having the first post-shaped members 203 erected therefrom is placed on the second post-shaped members 308 erected from the bottom 302 in the water-reserving bath 313 thereby to provide the planting portion 200 defined by the partition 214 and the upper portions of the side walls 314, over the water-reserving portion 300 defined by the bottom 302 and the lower portions of the side walls 314, as exemplified by an eighth embodiment of FIG. 12(c). Then, the structure of the planting portion 200 can be simplified and can be manufactured more inexpensively. The structure can be made by the greening structure 100, in which the planting portion 200 is laid on the water-reserving portion 300 by using the water-reserving bath 313 having the high side walls 314, as in FIG. 12(c), and by placing the plural partitions 214 for one water-reserving bath 313 on the second post-shaped members 308, as exemplified by a ninth embodiment of FIG. 12(d). Then, the structure of can be manufactured at a lower cost and at a reduced number of working steps.

As exemplified by a tenth embodiment of FIG. 12(e), moreover, the greening structure 100 is made by placing the partition 214 on the side walls 301 of the box-shaped water-reserving portion 300 and the second post-shaped members 308 thereby to form the planting portion 200 having no side wall on the water-reserving portion 300. These planting portion side walls are replaced by a marginal stone 500 covering the greening area in the greening facilities. Then, the manufacturing cost can be more reduced. As exemplified by an eleventh embodiment of FIG. 12(f), still moreover, the greening structure 100 is made by laying the single partition 214 on the plural water-reserving portions 300 and by providing one or integrated planting portion 200 on the plural water-reserving portions 300. Then, it is possible to reduce the manufacturing cost and the working steps more. Here, it is arbitrary to combine the sixth to eleventh embodiments and to combine the sixth to eleventh embodiments and the first to fifth embodiment suitably.

Moreover, the post-shaped members 203, 204, 307 and 308, the legs 209 and so on may be made integral with one another or made separate and assembled or adhered to the bottom 202, 302 or the like with an adhesive.

In the foregoing embodiments, moreover, the water-reserving portion 300 for forming the water-reserving space is used to maximize the water-reserving effect. However, the water-reserving portion 300 can be replaced by a suitable one such as a water-retaining portion filled with a water-retaining material or unwoven fabric having the water-retaining effect, or one having a water-reserving space and the water-retaining portion.

In addition to the construction having the plants 207 in the planting portion 200, moreover, stone plates or an wood deck may be placed on the first post-shaped members 203. Especially in case the water-retaining stone plates are placed, it is preferred that the stone plates can exhibit the transpiration effects. Moreover, the construction may also be made by filling pebbles or the like.

INDUSTRIAL APPLICABILITY

The greening structure of the invention can be utilized as the greening facilities to be formed on the roof, the terrace, the porch or the like.

The invention claimed is:

1. A greening structure comprising:
   an upper plant-cultivatable planting box including a base having four upstanding walls and substantially consecutive coextending post-shaped members disposed upward and downward from the base; and
   a lower water-reserving box arranged under the upper plant-cultivatable planting box and adaptable to be laid on a pavement for forming a greening area, the lower water-reserving box having four upstanding walls and a floor,
   wherein the post-shaped members disposed downward from the upper plant-cultivatable planting box contact the floor of the lower water-reserving box such that an external force loaded on the plant-cultivatable planting box is directly received on the pavement through the coextending post-shaped members.

2. A greening structure according to claim 1, further comprising:
   a retaining structure for retaining the vicinity of the floor of said lower water-reserving box and the vicinities of the lower ends of said post-shaped members which are disposed downward.

3. A greening structure according claim 2,
   wherein said substantially consecutive post-shaped members have no hollow portion.

* * * * *